Patented Jan. 10, 1939

2,143,515

UNITED STATES PATENT OFFICE 2,143,515

METHOD OF CURING CONCRETE

Harold P. Hayden, Woodbridge, N. J., assignor, by mesne assignments, to Barber Asphalt Corporation, Philadelphia, Pa., a corporation of New Jersey No Drawing. Application July 19, 1939, Serial No. 469,281

8 Claims. (Cl. 25—154)

This invention relates to a method of retarding the evaporation of water from concrete during the curing period in order to insure thorough hydration of the cement and thereby produce a concrete of maximum strength. The present invention relates to an improvement of the method forming the subject matter of my Patent No. 1,684,671, dated September 18, 1928.

In the practice of the process described in my prior patent when a bituminous emulsion or solution is used, the resulting film or coating is dark. Under normal conditions this is advantageous: first, because the solar radiation is absorbed with a resulting rise in temperature of the concrete and proportional acceleration of the curing action; and, secondly, because glare is prevented where the coating is used on a concrete roadway.

However, in tropical countries or during unusually hot weather in temperate climates, the absorption of solar energy may be such as to produce, in combination with the heat of reaction, a temperature such that the rate of curing of the concrete is undesirably rapid and shrinkage cracks may result.

Furthermore, while the dark bituminous coating is not generally objectionable on roads, it is sometimes objectionable in special road work or general concrete construction where appearance is a factor of importance.

It is the object of this invention to provide a method whereby the advantages of curing by covering the concrete with an impervious layer are retained but wherein the objections to the dark bituminous layer are avoided.

It is found that this object may be accomplished by one of three general methods. By the first method a film is formed which is transparent or translucent whereby the sun's rays pass through the film and are, to a large extent, reflected by the light surface of the concrete itself. Absorption is accordingly reduced so as to prevent the production of an objectionably high temperature. In this case, the color of the work will be approximately that of the concrete itself, perhaps slightly modified by the film if it be colored or not perfectly transparent.

In the second method an opaque film or one having a low degree of transparency is used, the opaque film itself being of a light color so as to reflect the sun's rays and thus avoid absorption of heat in the body of the concrete. The light color may be either that of the film-forming material itself or it may be produced by suitable pigment or coloring matter to produce the color or shade desired.

The third method involves covering a dark bituminous coating, resulting, for example, from the application of a bituminous solution or emulsion to the concrete, with a reflecting coating of light colored pigment or powder, by dusting or other method of spreading, or, alternatively, covering the dark bitumen by means of a light paint which may or may not in itself have the quality of being impervious so as to act as a protective coating.

The first and second methods may be carried out mechanically in similar manners, since both involve the application of a liquid to the concrete or cement after it is finished.

In carrying out the method, the coating may be applied in the form of an emulsion of a suitable material which will produce an impervious film when the emulsion breaks down, or in the form of a solution of a suitable material which will produce an impervious film on evaporation of the solvent. The material adapted to form the ultimate film may have a considerable variation of composition. For example, various petroleum products such as paraffine wax, steam reduced cylinder stock, petrolatum, or lubricating oils or greases of varying consistencies may be used; drying or semi-drying vegetable and animal oils, waxes or gums, or pine pitch, natural or synthetic resins or latices, or light colored condensation products of suitable consistency will be found adaptable. Certain of the substances given by way of example may be used alone, as, for example, where they possess desired coating power, or various of them may be used in combination and, for example, rosin, paraffin wax, or condensation products which may be of grades too hard for application as such may be mixed with light oils or solvents of suitable types, to produce a combination of a desirable coating power. When semi-plastic resins or waxes are used, it may be unnecessary to add any liquid to lessen their viscosities. Such materials alone may constitute the disperse phase of an emulsion at a temperature where they would normally be solid. When such emulsions break down the dispersed particles, which are of microscopic fineness, will coalesce so as to form a substantially impervious film.

The above enumeration does not exhaust the possible substances which may be used, and it will be understood that I contemplate the use of any substance which will form a substantially continuous film over the concrete and thus prevent evaporation of water therefrom during curing and which is transparent or light colored so as to minimize the absorption of solar heat by the concrete.

The continuous phase of emulsions of the type of materials enumerated should, of course, consist essentially of water both for economical reasons and to facilitate the spreading and formation of the substantially continuous film desired. The emulsifying agent is quite immaterial and is determined primarily by the nature of the specific substance dispersed as is well known in the art.

As an alternative procedure, the applied material may consist of any of the substances enumerated above either alone or in combination if the substance or combination has a viscosity rendering its direct application by spraying or brushing possible. For example, vegetable or animal oils, the former being either of a drying or non-drying type, or steam reduced cylinder stock or mixtures of these with rosin or paraffine having a viscosity suitable for application. If the viscosity of any of the above enumerated substances or mixtures thereof is too great, the substance may be dissolved in a volatile solvent, for example, a petroleum or other light oil, to produce a solution of desired viscosity.

The substances enumerated above, when used either alone or in combination, when deposited directly, by evaporation of a solvent or by the breaking down of an emulsion, form a water impervious film which is either transparent or translucent in varying degree and which will minimize the absorption of radiant heat by the concrete. If desired, a filler of light colored pigment may be added to the substances, or to solutions or emulsions thereof, not only to render the film more reflective but to increase the body of the material. Suitable pigments for this purpose would include lithopone, terra alba, white lead, zinc oxide, aluminum powder, etc.

As examples of emulsions which might be used: paraffin emulsions sold under the name Glycopon might be used, or a light colored bituminous emulsion, which may be pigmented if desired, that is sold under the name Albinalt, might be used; or linseed oil may be emulsified in a dilute caustic soda solution with or without the addition of pigment. If desired a commercial white paint may be emulsified in a dilute soap solution in a manner which is well known.

Suitable solutions that might be used would be boiled linseed oil containing a drier and either with or without a light colored pigment such as white lead. This material, which is essentially a paint, may be thinned with turpentine or a turpentine substitute if desired to facilitate application. A solution of a phenol aldehyde condensate made according to well known methods might be used. A light colored or colorless lacquer, as Duco for example, would be suitable. To these substances white or light colored pigments can be added if desired.

It will be understood that application of the films will desirably be made in the manner, under the conditions and with the results outlined in my Patent No. 1,684,671 referred to above, to which reference may be made for details.

With respect to the third method in which a dark bituminous coating is applied to the concrete as outlined in my said patent, the light reflecting surface may be formed on the bituminous film by dusting with a powder or flakes having light color or metallic reflecting characteristics. For example, white powders such as lime, limestone, talc, Portland cement, etc. may be dusted on the bituminous surface; or flakes of mica or metallic bronzes or aluminum may be spread in a thin coating.

Alternatively paints may be applied to the bituminous surface. These paints containing light pigments or reflecting bronzes or other metallic powders, may have the ordinary compositions. For example, suitable paints as ordinary oil paints, water paints, lacquers, etc. may be used, and desirably will contain a white pigment, though they may contain metallic powders or flakes as of aluminum, bronze, or the like.

It will be understood that where in the practice of the method in accordance with my invention the film, adapted to minimize the absorption of solar heat, is applied directly to the concrete and is also intended to prevent evaporation of water therefrom, it may be desirably applied to the concrete while it is unset, i. e. before it will support any substantial weight, as of a man, without marring, though it will be understood that it may be applied after the concrete has set but while it is still in an uncured state. Similarly where the film is applied over a bituminous film, it may be applied as soon as the bituminous film has been formed or thereafter but while the concrete is in an uncured state.

What I claim and desire to protect by Letters Patent is:

1. The method of curing concrete which includes applying to the concrete before it has set a homogeneous water impervious film to prevent substantial evaporation of water therefrom during the curing period, the said film being of a character such as to reflect light rays whereby absorption into the body of the concrete of solar heat is avoided during the curing period.

2. The method of curing concrete which includes applying to the concrete a water impervious film, said film being opaque and of light color throughout and adapted to reflect light and heat rays from its surface.

3. A method of protecting freshly poured concrete while it is curing which consists in applying to the surface of the concrete an emulsion of paraffin in water and permitting the emulsion to break for the formation of a film of paraffin over the concrete.

4. A method of protecting freshly poured concrete while it is curing, which consists in applying to the surface of the concrete an aqueous emulsion of an opaque, light colored substance capable of forming a substantially water-impervious film on breaking of the emulsion and permitting the emulsion to break for the formation of a film of said opaque, light colored substance over the concrete, said film being adapted to reflect light and heat rays from its surface.

5. The method of curing a concrete highway slab which includes applying a homogeneous, water-impervious film to the upper surface of a freshly poured concrete highway slab to prevent substantial evaporation of water therefrom during the curing period, the said film being of a character such as to reflect light rays whereby absorption of solar heat into the body of the slab is avoided during the curing period.

6. The method of curing artificial stone articles including concrete roads and the like, which comprises providing a rigid base of plastic stone material or the like and while still plastic applying a relatively thin layer of an aqueous dispersion of rubber directly to the surface of said plastic base, and allowing said dispersion to set up into a relatively thin homogeneous sheet of rubber to temporarily seal the base from the atmosphere during curing.

7. The method of curing hydraulic cement, which comprises providing a base of plastic material including a hydraulic cement and while the base is still plastic applying a relatively thin layer of an aqueous dispersion of rubber directly to an exposed surface of said base and allowing said dispersion to set up into a relatively thin homogeneous sheet of rubber to seal the base from the atmosphere during curing.

8. The method of curing concrete, which comprises providing a base of plastic concrete and while the base is still plastic applying a relatively thin layer of an aqueous dispersion of rubber directly to the surface of the base and allowing said dispersion to set up into a relatively thin homogeneous sheet of rubber to seal the base from the atmosphere during curing.

HAROLD P. HAYDEN.